(12) United States Patent
White (10) Patent No.: US 8,839,448 B2
(45) Date of Patent: Sep. 16, 2014

(54) GENERATION OF A HUMAN READABLE OUTPUT MESSAGE IN A FORMAT THAT IS UNREADABLE BY A COMPUTER-BASED DEVICE

(75) Inventor: Gareth D. White, Walnut Creek, CA (US)

(73) Assignee: salesforce.com, inc., San Francisco, CA (US)

(*) Notice: Subject to any disclaimer, the term of this patent is extended or adjusted under 35 U.S.C. 154(b) by 22 days.

(21) Appl. No.: 13/477,995

(22) Filed: May 22, 2012

(65) Prior Publication Data

US 2013/0097713 A1    Apr. 18, 2013

Related U.S. Application Data

(60) Provisional application No. 61/548,380, filed on Oct. 18, 2011.

(51) Int. Cl.
*G06F 21/00* (2013.01)
*G06F 21/56* (2013.01)
*G06F 21/62* (2013.01)
*G06F 21/84* (2013.01)

(52) U.S. Cl.
CPC ............ *G06F 21/56* (2013.01); *G06F 21/6209* (2013.01); *G06F 2221/2117* (2013.01); *G06F 21/84* (2013.01); *G06F 2221/2133* (2013.01)
USPC ............................................. 726/26; 705/51

(58) Field of Classification Search
CPC .. G06F 21/56; G06F 21/84; G06F 2221/2133
USPC ............................................... 726/26; 705/51
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |

(Continued)

OTHER PUBLICATIONS

Pope, "Is it human or computer? Defending e-commerce with CAPTCHAS", 2005, IEEE, vol. 7, p. 43-49.*

(Continued)

*Primary Examiner* — Thanhnga B Truong
*Assistant Examiner* — Gregory Lane
(74) *Attorney, Agent, or Firm* — Ingrassia Fisher & Lorenz, P.C.

(57) ABSTRACT

This disclosure relates to a system and related operating methods for generating a message intended for display at a computer-implemented client device. The method receives, from the client device, a request to perform an operation. In response to receiving the request, the operation is executed at a computer-implemented server device to obtain a result. An alphanumeric message associated with the result is obtained, and an image is generated. The image contains a visually obfuscated representation of the alphanumeric message, wherein the visually obfuscated representation of the alphanumeric message is human readable and resistant to computer-based reading techniques. The method continues by providing the image for rendering at a display element of the client device.

20 Claims, 6 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,901,436 B1 * | 5/2005 | Schneider ............... 709/219 |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0005500 A1 * | 1/2007 | Steeves et al. ............... 705/51 |
| 2008/0281704 A1 * | 11/2008 | Shuhy et al. ............... 705/14 |
| 2009/0138723 A1 * | 5/2009 | Nyang et al. ............... 713/182 |
| 2010/0125639 A1 * | 5/2010 | Wang et al. ............... 709/206 |
| 2010/0274887 A1 * | 10/2010 | Sanghavi ............... 709/224 |
| 2011/0113378 A1 * | 5/2011 | Boden et al. ............... 715/837 |
| 2011/0271349 A1 * | 11/2011 | Kaplan ............... 726/26 |
| 2012/0297190 A1 * | 11/2012 | Shen et al. ............... 713/168 |

OTHER PUBLICATIONS

"Image spam," From Wikipedia, the free encyclopedia. http://en.wikipedia.org/wiki/Image_spam, May 18, 2012.

* cited by examiner

GENERATION OF A HUMAN READABLE OUTPUT MESSAGE IN A FORMAT THAT IS UNREADABLE BY A COMPUTER-BASED DEVICE

CROSS-REFERENCE TO RELATED APPLICATION(S)

This application claims the benefit of U.S. provisional patent application Ser. No. 61/548,380, filed Oct. 18, 2011.

TECHNICAL FIELD

Embodiments of the subject matter described herein relate generally to computer systems and related operating processes. More particularly, embodiments of the subject matter relate to security, authentication, and verification techniques suitable for use with computer systems.

BACKGROUND

Computer systems, computer-implemented devices, and related operating processes and communication protocols are well known. Many computer devices are designed to support network communication, e.g., Internet connectivity. Although the Internet is a very useful tool, it can also be used for a variety of malicious purposes. For example, phishing attacks, electronic virus distribution, and spamming can be carried out via the Internet. As another example, web bots can be written to perform activities (that are normally performed by human users) in an attempt to gather information or data that would otherwise not be readily available. In this regard, a web bot could be designed to impersonate a human user during an account registration or signup procedure for a website, a web-based service, or the like. The goal of this type of web bot is to collect information related to the validity of email addresses, usernames, or the like. Thus, a web bot can be programmed to iteratively attempt to register for a website using random email addresses or usernames while monitoring for a response (typically in the format of readable text) that indicates whether or not an entered email address or username has already been taken. Ultimately, the web bot can generate a list of valid email addresses for a given web domain, which can be valuable for purposes of spamming, hacking, or other nefarious activities.

Accordingly, it is desirable to have a technique or technology that can be used to thwart the efforts of web bots or other computerized approaches that attempt to read and interpret text-based responses associated with certain operations, functions, or procedures. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter presented here relates to a computer-implemented methodology for generating and displaying human readable text in a format that is difficult if not impossible to read using automated means. More specifically, a system and related operating processes are provided that can be used to generate and display response messages in a manner that can be read by human users while being difficult if not impossible to read and understand by software scripts, automated web bots, search applications, and the like. In accordance with an exemplary implementation, the system and related operating processes are utilized during a user signup or registration procedure for purposes of generating confirmation, error, or other designated messages or notifications that might convey sensitive, confidential, or other information that is only intended to be read by the user.

Many websites require an email address to log and/or verify the identity of an authorized user. For example, a user with the email address of asmith@salesforce.com may use this email address to log into his web-based account at salesforce.com. Unfortunately, email related information can also be used for nefarious purposes. A malicious third party can enter the asmith@salesforce.com email address at salesforce.com and verify that asmith is a valid salesforce.com account holder, even if the third party does not have the password associated with the username asmith. On the other hand, bsmith@salesforce.com may not correspond to a valid account on salesforce.com. Thus, if a malicious third party attempts to log into salesforce.com using the bsmith@salesforce.com email address, the system may generate a text-based error message, thereby confirming that the login information is invalid. Indeed, a simple web bot or other software application can be programmed to enter various permutations of email addresses at a registration, signup, or login page. The bot can be written to identify returned text messages that indicate success (i.e., a valid email address was entered), and to identify returned text messages that indicate a failure or an error (i.e., an invalid email address was entered). This information can then be used to build a list of valid and invalid email addresses. The list of valid email addresses can then be used for spamming or phishing attacks, or sold to other malicious parties.

The account creation stage can also be abused and used to identify valid and invalid email addresses. For example, a bot can be programmed to submit account holder email addresses to confirm whether those email addresses are already in the system. If an email address is already used by an existing system user, the system will typically respond with an applicable text message, such as: THAT EMAIL ADDRESS IS ALREADY TAKEN. PLEASE CHOOSE ANOTHER EMAIL ADDRESS. In this scenario, a web bot can be used to recognize certain text strings, and use this information to build a list of valid email addresses.

An embodiment is directed to preventing malicious third parties from gathering a list of valid email addresses and/or usernames. In an embodiment, when an email address is requested for verification, login, account creation, or the like, a message in response to an entered email address may be encoded as an image, rather than text. In this fashion, any attempts by a bot or other malicious scanning program would be prevented from reading or otherwise recognizing the response message. In certain embodiments, response message images can convey human readable text that indicates successful or unsuccessful attempts to log in. In an embodiment, the appearance of the response messages can change over time to prevent a bot from learning whether an attempt to enter in an email address was successful or unsuccessful.

In an exemplary embodiment, the text conveyed in a response message image may be altered and/or obfuscated in one or more of the following ways, without limitation: (1) position in the graphic; (2) wording of the message; (3) font; (4) font size; (5) color; (6) kerning; (7) background effects; (8) distortions; and (9) animation. In accordance with one exemplary implementation, an image file is created such that it contains contain both a "success" and a "failure" message, but the pixel value and color map combination would only make one message visible to the user. Moreover, the algorithm or routine that is used to determine the format and graphical characteristics for display of any given response message can be maintained in a secure and confidential manner.

Figure 1:
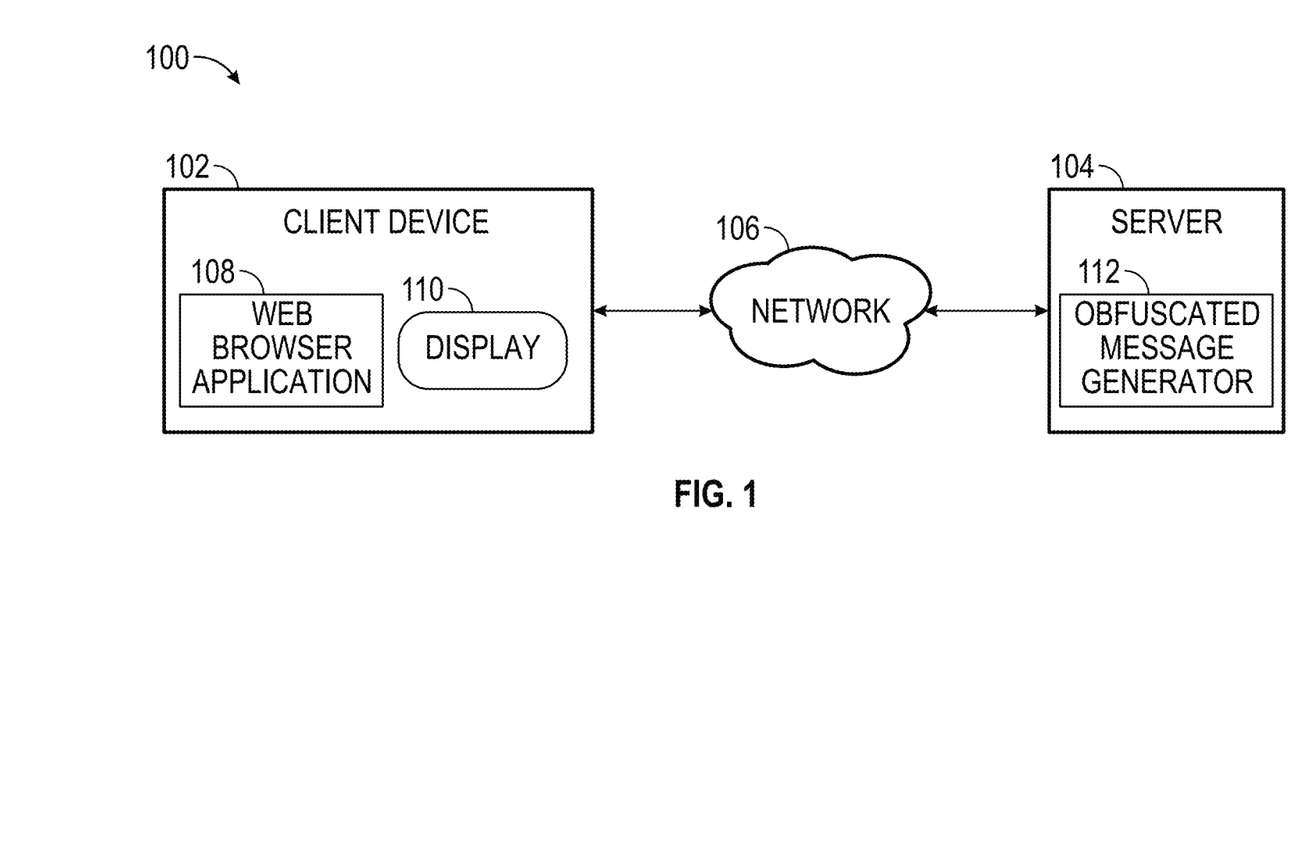
FIG. 1 is a schematic representation of an exemplary embodiment of a computer-implemented system.

Referring now to the drawings, FIG. 1 is a schematic representation of an exemplary embodiment of a computer-implemented system 100. Although certain embodiments described here relate to a web-based system, the techniques and methodologies can be utilized in other types of network arrangements. Moreover, the simplified system 100 shown and described here represents only one possible embodiment of a system for generating a message intended for display at a computer-implemented client device. The illustrated embodiment of the system 100 includes a client device 102 and a server 104 operatively coupled to each other through a data communication network 106. The system 100 is preferably realized as a computer-implemented system in that the client device 102 and the server 104 are configured as computer-based electronic devices.

Although only one client device 102 and only one server 104 are shown in FIG. 1, an embodiment of the system 100 could support any number of client devices and any number of server devices. Each client device 102 supported by the system 100 may be implemented using any suitable hardware platform. In this regard, the client device 102 may be realized in any common form factor including, without limitation: a desktop computer; a mobile computer (e.g., a tablet computer, a laptop computer, or a netbook computer); a smartphone; a video game device; a digital media player; a piece of home entertainment equipment; or the like. Each client device 102 supported by the system 100 is realized as a computer-implemented or computer-based device having the hardware, software, firmware, and/or processing logic needed to carry out the processes described in more detail herein. For example, the client device 102 may include a web browser application 108 (having conventional web browser functionality) that facilitates the rendering of web pages, images, documents, and other visual content at a display element 110. The display element 110 may be incorporated into the client device 102 itself (for example, if the client device 102 is implemented as a tablet computer or a smartphone device), or it may be realized as a physically distinct component that is operatively coupled to the client device 102, as is well understood.

The server 104 can be deployed in certain embodiments of the system 100 to manage, handle, and/or serve some or all of the response message functionality for the client devices. In this regard, the server 104 may include web server functionality to generate and provide web pages and/or other hypertext markup language (HTML) documents to the client device 102 as needed. In practice, the server 104 may be realized as a computer-implemented or computer-based system having the hardware, software, firmware, and/or processing logic needed to carry out the various techniques and methodologies described in more detail herein. More particularly, the server 104 is suitably configured to generate or otherwise obtain certain images to be provided to the client device 102 in response to the execution of various operations, procedures, or the like, where the images contain or convey visually obfuscated alphanumeric messages associated with the result or results of the executed operations, procedures, etc. As explained in more detail below, the visual obfuscation is desirable to make the messages difficult or impossible to read, or otherwise resistant to computer-based reading techniques such as text recognition, optical character recognition, or the like. Notably, the amount of visual obfuscation or image processing applied to the messages is regulated such that the alphanumeric messages remain intelligible and readable to a human user.

The system 100 includes an obfuscated message generator 112, which may be realized at the server 104 (as shown in FIG. 1), at the client device 102, or distributed across multiple computer-based components of the system 100. The obfuscated message generator 112 is responsible for accessing, obtaining, or creating images that contain or convey visually obfuscated representations of alphanumeric messages that are intended for delivery to the client device 102. To this end, the client device 102 is suitably configured to receive, process, and render the images provided by the server 104 using the native features and functionality of the client device 102 (such as the web browser and any associated graphics processing logic).

The data communication network 106 provides and supports data connectivity between the client device 102 and the server 104. In practice, the data communication network 106 may be any digital or other communications network capable of transmitting messages or data between devices, systems, or components. In certain embodiments, the data communication network 106 includes a packet switched network that facilitates packet-based data communication, addressing, and data routing. The packet switched network could be, for example, a wide area network, the Internet, or the like. In various embodiments, the data communication network 106 includes any number of public or private data connections, links or network connections supporting any number of communications protocols. The data communication network 106 may include the Internet, for example, or any other network based upon TCP/IP or other conventional protocols. In various embodiments, the data communication network 106 could also incorporate a wireless and/or wired telephone network, such as a cellular communications network for communicating with mobile phones, personal digital assistants, and/or the like. The data communication network 106 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol.

Figure 2:
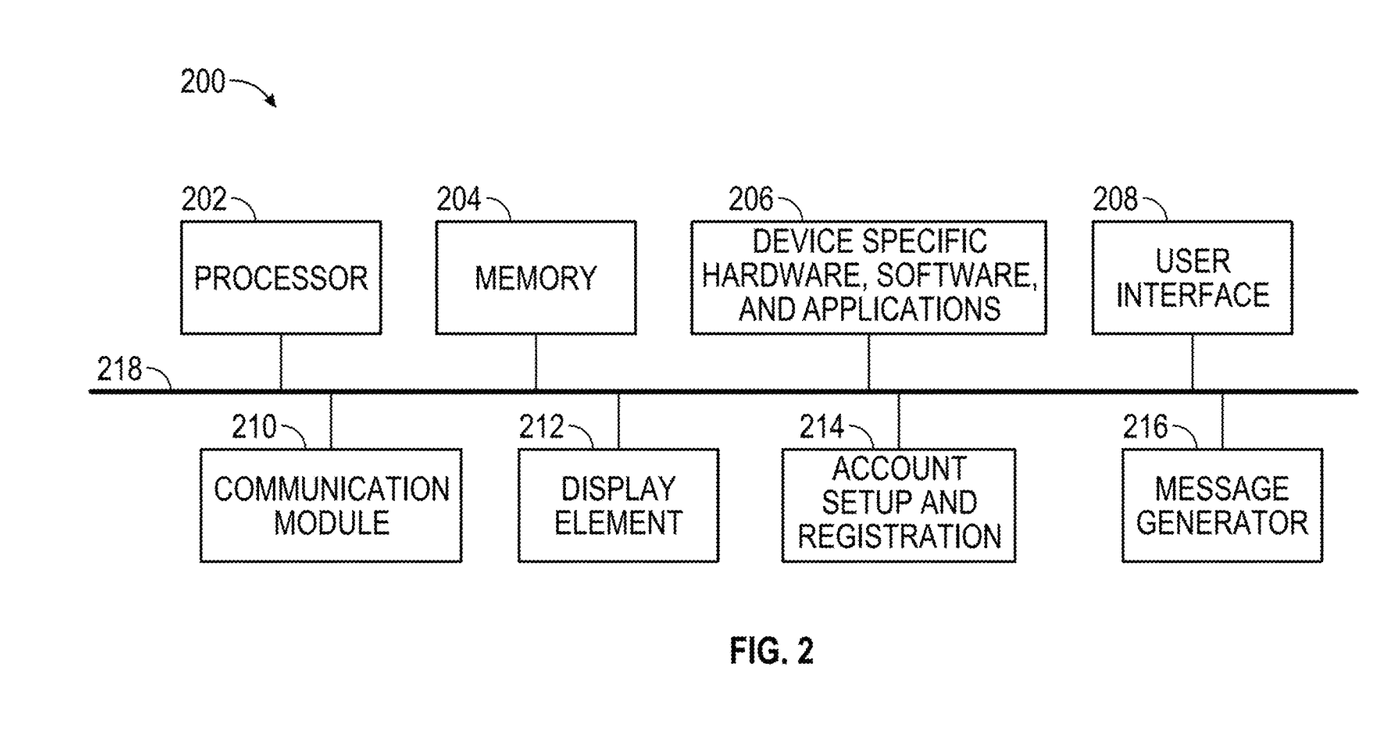
FIG. 2 is a schematic representation of an exemplary embodiment of a computer-implemented device suitable for use in a system such as that depicted in FIG. 1.

FIG. 2 is a schematic representation of an exemplary embodiment of a computer-implemented apparatus, system, or device 200 suitable for use in a system such as that depicted in FIG. 1. In practice, the client device 102 and the server 104 could be generally configured and implemented as shown in FIG. 2. Thus, the following general description of the device 200 may be applicable to the client device 102 and/or the server 104.

The illustrated embodiment of the device 200 includes, without limitation: at least one processor 202; a suitable amount of memory 204; device-specific hardware, software, firmware, and/or applications 206; a user interface 208; a communication module 210; a display element 212; account setup and registration logic 214; and a message generator 216. Of course, the device 200 may include additional elements, components, modules, and functionality configured to support various features that are unrelated to the subject matter described here. For example, the device 200 may include certain features and elements to support conventional functions that might be related to the particular implementation and deployment of the device 200. In practice, the elements of the device 200 may be coupled together via a bus or any suitable interconnection architecture 218.

The processor 202 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The memory 204 may be realized as RAM memory, flash memory, EPROM memory, EEPROM memory, registers, a hard disk, a removable disk, a CD-ROM, or any other form of storage medium known in the art. In this regard, the memory 204 can be coupled to the processor 202 such that the processor 202 can read information from, and write information to, the memory 204. In the alternative, the memory 204 may be integral to the processor 202. As an example, the processor 202 and the memory 204 may reside in an ASIC. The memory 204 can be used to store computer-readable media, where a tangible computer-readable medium has computer-executable instructions stored thereon. The computer-executable instructions, when read and executed by the device 200, cause the device 200 to perform certain tasks, operations, functions, and processes described in more detail herein. In this regard, the memory 204 may represent one suitable implementation of such computer-readable media. Alternatively or additionally, the device 200 could receive and cooperate with computer-readable media (not separately shown) that is realized as a portable or mobile component or platform, e.g., a portable hard drive, a USB flash drive, an optical disc, or the like.

When the device 200 is implemented as the server 104, the memory 204 may be used to store one or more alphanumeric messages, which may be static or dynamically generated as needed. The stored messages can be accessed and processed if needed to create images that convey obfuscated representations of the stored messages. Alternatively (or additionally), the memory 204 could be used to store one or more image files that contain predetermined alphanumeric messages that have already been subjected to visual obfuscation. In other words, obfuscating techniques can be applied to a number of common or frequently used "canned" messages, and the preprocessed images can be stored in the memory 204 for access and retrieval when needed.

The device-specific hardware, software, firmware, and applications 206 may vary from one embodiment of the device 200 to another. For example, the device-specific hardware, software, firmware, and applications 206 will support telephone functions and features when the device 200 is realized as a mobile telephone, conventional personal computer functions and features if the device 200 is realized as a desktop or portable computer, and server functions and features if the device 200 is realized as a messaging server system. In practice, certain portions or aspects of the device-specific hardware, software, firmware, and applications 206 may be implemented in one or more of the other blocks depicted in FIG. 2.

The user interface 208 may include or cooperate with various features to allow a user to interact with the device 200. Accordingly, the user interface 208 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the device 200.

The communication module 210 facilitates data communication between the device 200 and other components as needed during the operation of the device 200. In the context of this description, the communication module 210 can be employed during a data communication session that includes the device 200 as one of the participant devices. For example, the client device 102 and the server 104 utilize their respective communication modules to support data communication between them. An embodiment of the device 200 may support wireless data communication and/or wired data communication, using various data communication protocols. For example, the communication module could support one or more wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Moreover, the communication module could support one or more wired/cabled data communication protocols, including, without limitation: Ethernet; home network communication protocols; USB; IEEE 1394 (Firewire); hospital network communication protocols; and proprietary data communication protocols.

The display element 212 is suitably configured to enable the device 200 to render and display various screens, graphical user interfaces (GUIs), drop down menus, auto-fill fields, text entry fields, message fields, or the like. Of course, the display element 212 may also be utilized for the display of other information during the operation of the device 200, as is well understood. Notably, the specific configuration, operating characteristics, size, resolution, and functionality of the display element 212 can vary depending upon the practical implementation of the device 200. For example, if the device 200 is a desktop computer, then the display element 212 may be a relatively large monitor. Alternatively, if the device 200 is a cellular telephone device, then the display element 212 may be a relatively small integrated display screen, which may be realized as a touch screen.

The account setup and registration logic 214 may be implemented by hardware, software, firmware, and/or processing logic that supports various account setup, user registration, signup, and similar operations. In certain embodiments, the account setup and registration logic 214 and the message generator 216 are implemented together as one functional module—FIG. 2 depicts them as distinct elements for ease of illustration. The account setup and registration logic 214 is used to create user accounts, register users of a service, and/or to perform similar operations that might require the collection of sensitive, confidential, or valuable information such as user credentials, user identifiers, email addresses, usernames, or the like. The specific methodologies associated with the account setup and registration logic 214 may vary from one embodiment to another and from one procedure to another; the subject matter described here is applicable to any particular methodology performed by the account setup and registration logic 214.

As will become apparent from the following description, the account setup and registration logic 214 is merely one possible embodiment of a processing module or logic that performs an operation that obtains a result, where the result may call for the generation and delivery of a human readable alphanumeric message. In this regard, the message generator 216 may cooperate with the account setup and registration logic 214 and/or any suitably configured processing module to create images that contain obfuscated alphanumeric messages, where the message content is relevant or otherwise associated with certain operations, functions, or processes performed by the device 200. In practice, therefore, the specific operations performed by the device 200, the corresponding results obtained from the operations, and the particular content of the alphanumeric messages related to the results will vary from one embodiment to another, depending upon the intended functionality of the device and depending on the information to be conveyed in the messages.

Figure 3:
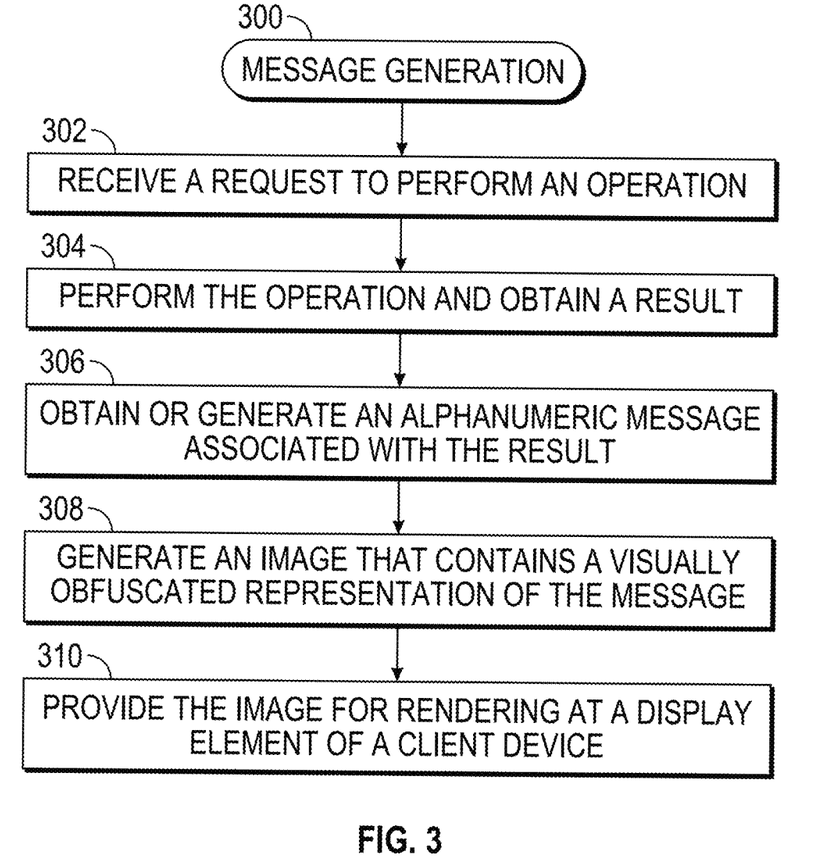
FIG. 3 is a flow chart that illustrates an exemplary embodiment of a message generation process.

FIG. 3 is a flow chart that illustrates an exemplary embodiment of a message generation process 300, which may be carried out by a system such as that depicted in FIG. 1. In certain practical embodiments, the process 300 may be realized as a computer-implemented method of generating a message intended for display at a computer-implemented client device. The various tasks performed in connection with a process described herein (such as the process 300) may be performed by software, hardware, firmware, or any combination thereof. For illustrative purposes, a description of a process may refer to elements mentioned above in connection with FIG. 1 and FIG. 2. In practice, portions of a described process may be performed by different elements of the described system, e.g., a client device, a server device, or a component or element thereof. It should be appreciated that a described process may include any number of additional or alternative tasks, the illustrated tasks need not be performed in the illustrated order, and that a described process may be incorporated into a more comprehensive procedure or process having additional functionality not described in detail herein. Moreover, one or more of the tasks shown in a figure could be omitted from an embodiment of the described process as long as the intended overall functionality remains intact.

The illustrated embodiment of the process 300 begins by receiving a request to perform an operation (task 302). This example assumes that the request is issued by a client device, and that the request is received at a server device. As mentioned above, the requested operation may be any designated function, process, method, or procedure; the process 300 generally applies to any desired operation. In response to receiving the request, the process 300 executes the requested operation in an appropriate manner (task 304). In accordance with this particular example, task 304 is performed at the server device to obtain at least one result.

This example assumes that the obtained result includes or is somehow associated with at least one alphanumeric message to be conveyed to a user. Accordingly, the process 300 may continue by obtaining, generating, or accessing an alphanumeric message associated with the result (task 306). It should be appreciated that the content, context, and meaning of the message may vary from one embodiment to another, and from one iteration of the process 300 to another; the specific message is unimportant for purposes of this description. For example, and without limitation, the alphanumeric message may be any one of:

"That email address is already taken. Please enter a different email address and try again."

"Registration completed. Please retain your username and password."

"The username you entered is invalid."

"Invalid mailing address entered."

For the reasons explained above, it may be desirable to prevent reading of the alphanumeric message by a web bot, a software script or application, a computer-based reading technique, or the like. Accordingly, the message is altered, processed, or otherwise treated in an appropriate manner to make it resistant to computer-based reading techniques. In this regard, the process 300 generates or otherwise obtains an image that contains a visually obfuscated representation of the alphanumeric message (task 308). Notably, the visually obfuscated representation retains enough of its original character to remain human readable and intelligible, while being difficult if not impossible to read using common computer-based methodologies. Consequently, the image can be used to convey the meaning of the alphanumeric message rather than providing the message in a traditional text format that can be easily read and interpreted using computer-based techniques.

After the "obfuscated message" image has been generated, the process 300 provides the image for rendering at a display element of the client device (task 310). In certain exemplary embodiments, the image is provided for rendering with a web page. Accordingly, the image data could be provided with an HTML document that is retrieved by a web browser application resident at the client device. Alternatively (or additionally), the image could be provided in an email, a text message, a pop-up window, or the like. Indeed, the image could be delivered or sent using any data communication technique or technology that is compatible with the client device. Upon receipt, the client device can process and render the image for display using its native processing capabilities. For example, the web browser application of the client device can be refreshed to present the image to a user of the client device. Display of the image in this manner allows a human user to view and read the alphanumeric message that forms the foundation of the image.

In certain embodiments, the process 300 generates the image such that the visually obfuscated representation of the message exhibits inconsistent typographical characteristics and/or such that the visually obfuscated representation of the message is rendered with inconsistent presentation characteristics. In this regard, the process 300 may utilize technology that is commonly used to generate a CAPTCHA (Completely Automated Public Turing test to tell Computers and Humans Apart). For example, the process 300 may alter one or more typographical characteristics of the intended alphanumeric message such that the characteristics are inconsistent, varied, or non-uniform when displayed. The typographical characteristics may include, without limitation: font type (e.g., Times Roman, Courier, Arial, etc.); font size; color; kerning; font style (e.g., bold, italics, underline, etc.); capitalization; and spacing. As another example, the process 300 may alter one or more presentation or display characteristics of the image itself such that the characteristics are inconsistent, varied, or non-uniform. Such presentation characteristics may include, without limitation: position of the alphanumeric message or text within the image boundary; orientation of the message or individual message characters within the image; background effects; foreground effects; strikeout effects; highlighting; and animation effects.

Figure 4:
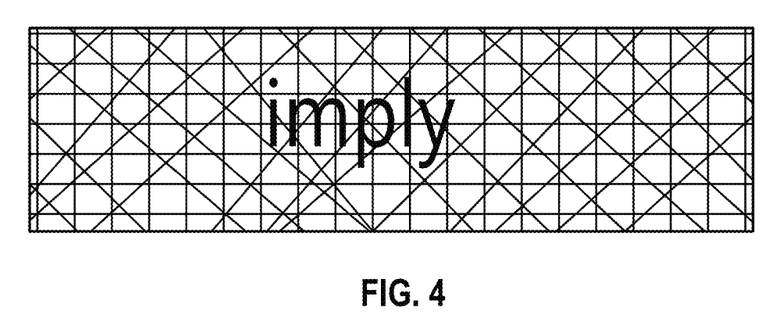
FIGS. 4-6 are diagrams that illustrate exemplary images that contain visually obfuscated alphanumeric content.
Figure 5:
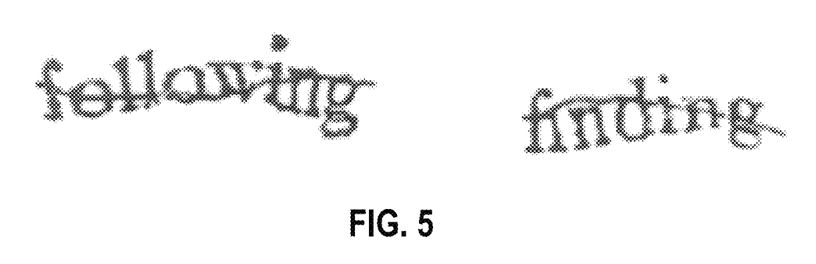
Figure 6:
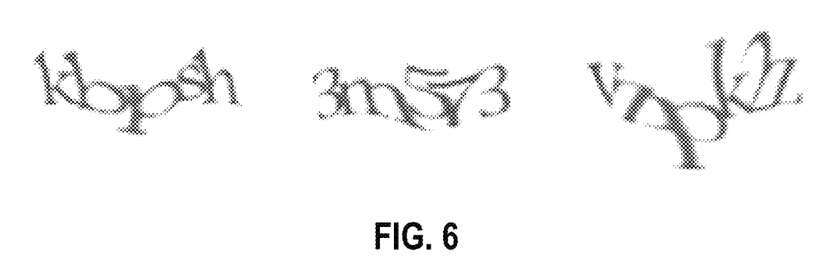

FIGS. 4-6 are diagrams that illustrate exemplary images that contain visually obfuscated alphanumeric content. These images are representative of the type of visual obfuscations that can be applied to an alphanumeric message generated by the process 300. FIG. 4 conveys the message "imply" using background and foreground effects that make it difficult to clearly read the embedded message. FIG. 5 conveys the words "following finding" using an inconsistent font that produces curved words. In addition, the words depicted in FIG. 5 have been further distorted with a curved strikeout line that intersects the displayed letters. FIG. 6 conveys the characters "kbpsh 3 m573 vzpk2z" using an inconsistent font and a kerning approach that makes the individual characters crowd one another. These and other techniques can be leveraged by the process 300 as needed.

In certain embodiments, the process 300 generates and provides encoded image data that contains information for a plurality of different alphanumeric messages. Thus, the image data itself includes information that is capable of conveying multiple messages. However, the encoded image data also includes additional information (e.g., metadata, color mapping data, or key data) that identifies, reveals, or is otherwise used to select one of the plurality of different alphanumeric messages for rendering at the client device. For example, an image could be encoded such that it includes both Message A and Message B, along with color mapping or some other pixel-based data that enables the client device to display or favor one message over the other. Thus, an image can be generated such that it contains the pixel data or information for a plurality of different messages. The color mapping of the image is altered or configured such that only one of the encoded messages has enough contrast to be visible by a human. This would enhance security, because a computerized device would "see" all of the encoded messages without being able to easily determine which message is the one intended to be conveyed to the user.

Figure 7:
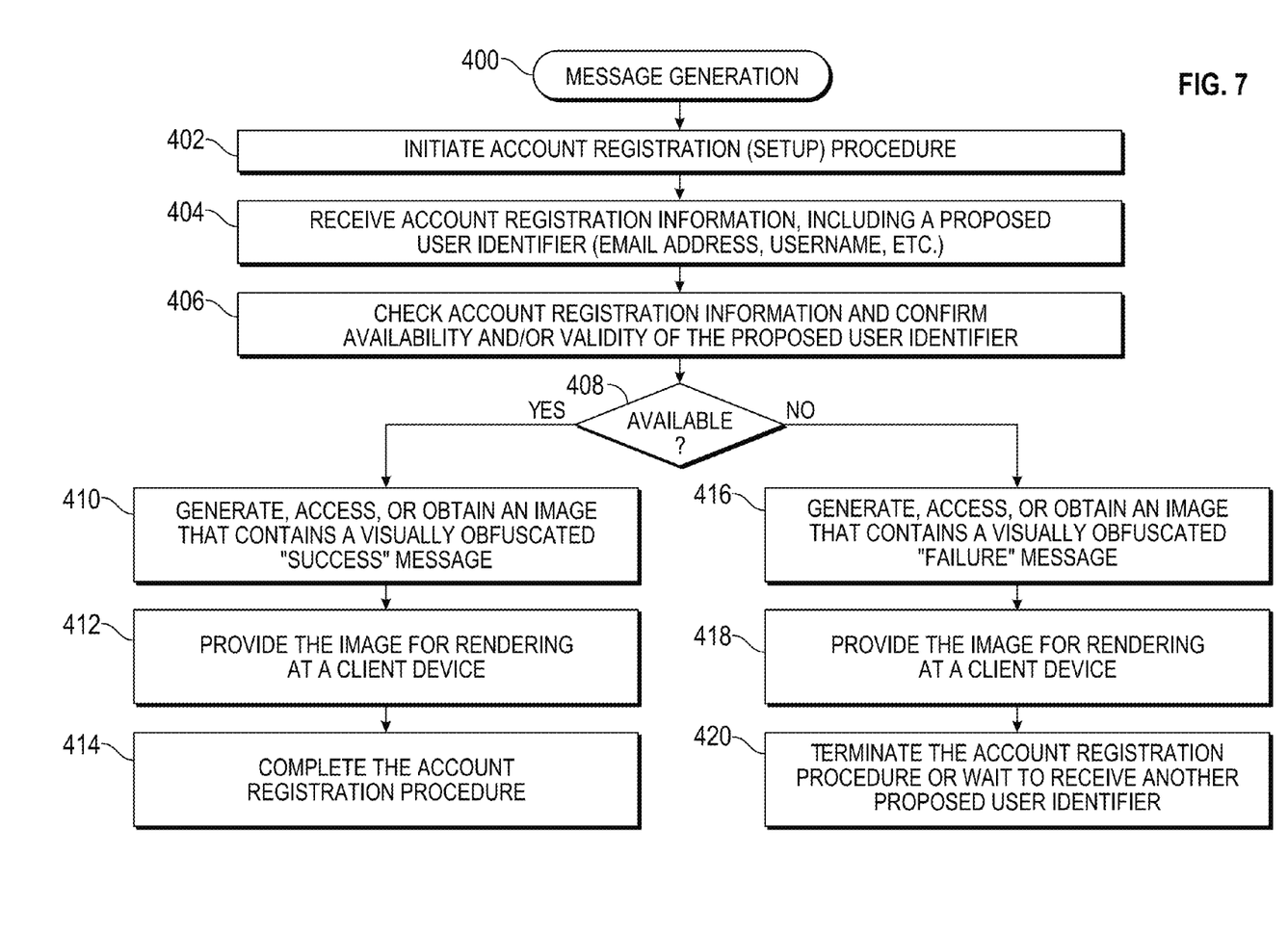
FIG. 7 is a flow chart that illustrates another exemplary embodiment of a message generation process.

As mentioned above, the process 300 may be associated with any specific operation, methodology, or procedure that involves a client device. In accordance with one exemplary embodiment, the operation involves an account registration procedure, a user signup procedure, an account creation procedure, or the like. In this regard, FIG. 7 is a flow chart that illustrates another exemplary embodiment of a message generation process 400, which is suitable for use during an account registration or setup routine.

The process 400 begins by initiating an account registration procedure (task 402). In practice, the account registration procedure may be associated with a designated web site, a web-based service, or the like. During the account registration procedure, a user may be prompted to enter certain account registration information, such as the user's name, address, phone number, age, etc. Moreover, the account registration information may include a proposed identifier for the user. The proposed identifier may be, for example, an email address, a username, a personal identification number (PIN), or the like. This example assumes that the process 400 receives a request to create an account for the user, and that the request includes any necessary account registration information. In particular, this example assumes that the process 400 receives the proposed user identifier (task 404).

The process 400 may continue by checking or confirming whether or not the proposed user identifier is available for use with a new user account (task 406). In practice, the process 400 may check the received account registration information to confirm the availability and/or validity of the user-entered proposed identifier. If the proposed user identifier is available (the "Yes" branch of query task 408), then the process 400 generates, accesses, or otherwise obtains a suitable image that contains a visually obfuscated alphanumeric "Success" message (task 410). The Success message will be visually obfuscated using one or more of the obfuscation approaches mentioned above. The process 400 continues by providing the Success message for rendering at the client device (task 412) and, if applicable, by completing the account registration procedure as needed (task 414). The image conveying the obfuscated Success message is rendered and displayed at the client device in a manner that is readable by a human user, but is resistant to computer-based reading techniques. Consequently, a human user will be able to read and interpret the text embedded in the Success message, while the embedded text remains unreadable by computer-based means.

If the proposed user identifier is not available (the "No" branch of query task 408), then the process 400 generates, accesses, or otherwise obtains a suitable image that contains a visually obfuscated alphanumeric "Failure" message (task 416). The Failure message includes words that explain that the user-entered identifier is invalid or otherwise unavailable. The Failure message may also contain words that ask the user to select a different proposed identifier in an attempt to complete the registration or setup operation. The Failure message will be visually obfuscated using one or more of the obfuscation approaches mentioned above. The process 400 continues by providing the Failure message for rendering at the client device (task 418). Depending upon the particular embodiment and/or the current status of the process 400, the registration or setup procedure may be terminated or the process 400 may wait to receive another proposed user identifier (task 420). The image that contains the obfuscated Failure message is rendered and displayed at the client device in a manner that is readable by a human user, but is resistant to computer-based reading techniques. Consequently, a human user will be able to read and interpret the text embedded in the Failure message, while the embedded text remains unreadable by computer-based means.

As explained previously, the actual content of the Success and Failure messages may be dynamically selected in an ongoing manner, or the content may be predetermined. Similarly, the images provided to the client device may be dynamically generated on the fly, or they may be accessed and retrieved from a library of stored images. If a library of stored images is used, the process 400 may select an appropriate image that corresponds to the desired message to be sent. Dynamic generation of obfuscated images may add an amount of randomness to the process 400, which may be desirable to further protect the messages. In other words, the manner in which the alphanumeric messages are obfuscated or scrambled can be varied to make it more difficult for computer-based techniques to read the messages.

The exemplary embodiments presented here relate to various computer-implemented and computer-executed techniques related to the generation and processing of response messages. The described subject matter could be implemented in connection with any suitable computer-based architecture, system, network, or environment, such as two or more user devices that communicate via a data communication network. Although the subject matter presented here could be utilized in connection with any type of computing environment, certain exemplary embodiments can be implemented in conjunction with a multi-tenant database environment.

Figure 8:
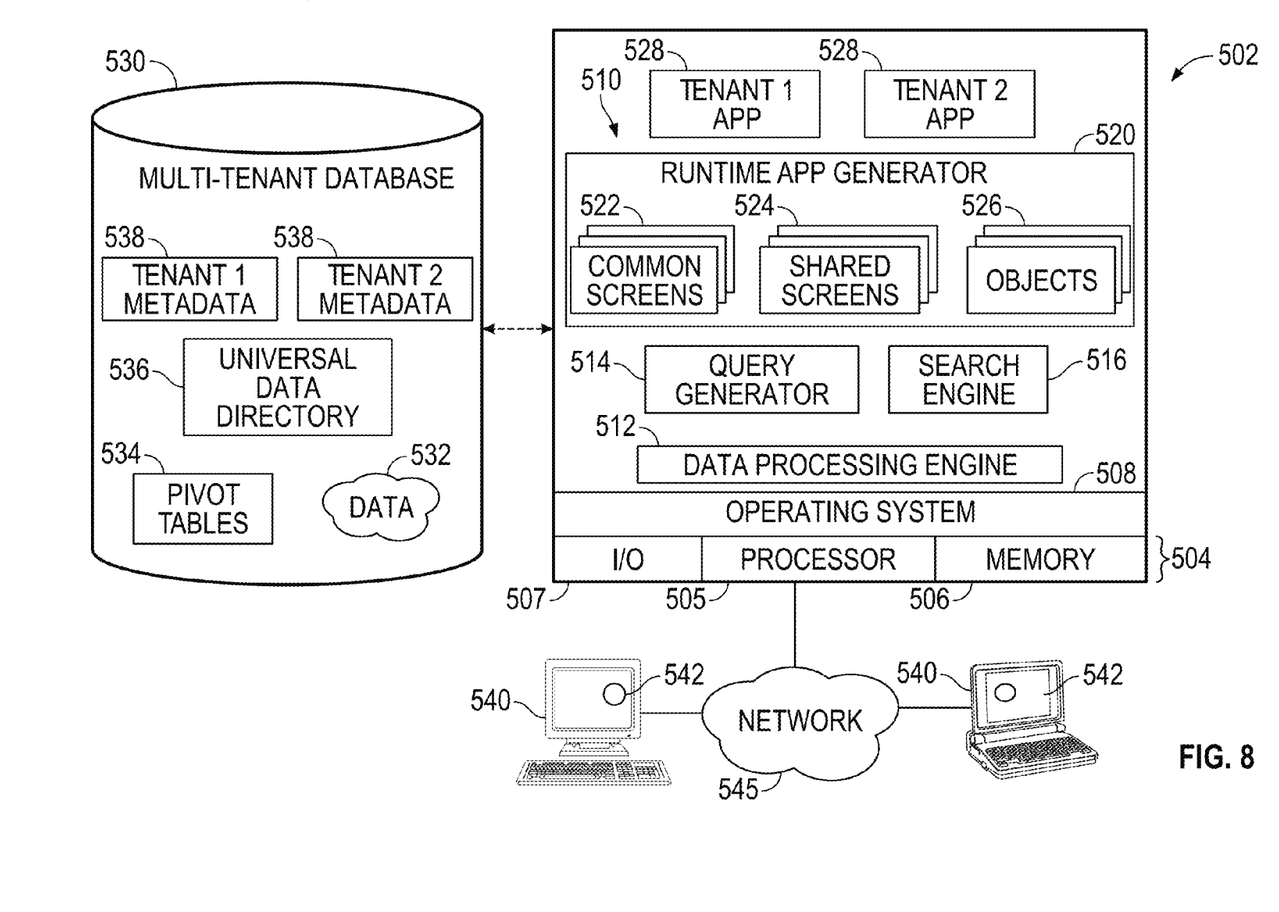
FIG. 8 is a schematic representation of an exemplary embodiment of a multi-tenant application system.

In this regard, an exemplary embodiment of a multi-tenant application system 500 is shown in FIG. 8. The system 500 suitably includes a server 502 that dynamically creates virtual applications 528 based upon data 532 from a common database 530 that is shared between multiple tenants. Data and services generated by the virtual applications 528 are provided via a network 545 to any number of user devices 540, as desired. Each virtual application 528 is suitably generated at run-time using a common application platform 510 that securely provides access to the data 532 in the database 530 for each of the various tenants subscribing to the system 500. In accordance with one non-limiting example, the system 500 may be implemented in the form of a multi-tenant CRM system that can support any number of authenticated users of multiple tenants.

A "tenant" or an "organization" generally refers to a group of users that shares access to common data within the database 530. Tenants may represent customers, customer departments, business or legal organizations, and/or any other entities that maintain data for particular sets of users within the system 500. Although multiple tenants may share access to the server 502 and the database 530, the particular data and services provided from the server 502 to each tenant can be securely isolated from those provided to other tenants. The multi-tenant architecture therefore allows different sets of users to share functionality without necessarily sharing any of the data 532.

The database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein.

The data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. The server 502 operates with any sort of conventional processing hardware 504, such as a processor 505, memory 506, input/output features 507 and the like. The processor 505 may be implemented using one or more of microprocessors, microcontrollers, processing cores and/or other computing resources spread across any number of distributed or integrated systems, including any number of "cloud-based" or other virtual systems. The memory 506 represents any non-transitory short or long term storage capable of storing programming instructions for execution on the processor 505, including any sort of random access memory (RAM), read only memory (ROM), flash memory, magnetic or optical mass storage, and/or the like. The server 502 typically includes or cooperates with some type of computer-readable media, where a tangible computer-readable medium has computer-executable instructions stored thereon. The computer-executable instructions, when read and executed by the server 502, cause the server 502 to perform certain tasks, operations, functions, and processes described in more detail herein. In this regard, the memory 506 may represent one suitable implementation of such computer-readable media. Notably, the processor 505 and the memory 506 may be suitably configured to carry out the various account registration, setup, and image generation operations described above.

The input/output features 507 represent conventional interfaces to networks (e.g., to the network 545, or any other local area, wide area or other network), mass storage, display devices, data entry devices and/or the like. In a typical embodiment, the application platform 510 gains access to processing resources, communications interfaces and other features of the processing hardware 504 using any sort of conventional or proprietary operating system 508. As noted above, the server 502 may be implemented using a cluster of actual and/or virtual servers operating in conjunction with each other, typically in association with conventional network communications, cluster management, load balancing and other features as appropriate.

The application platform 510 is any sort of software application or other data processing engine that generates the virtual applications 528 that provide data and/or services to the user devices 540. The virtual applications 528 are typically generated at run-time in response to queries received from the user devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the user devices 540. The virtual applications 528 created by tenants are typically constructed in accordance with the tenant-specific metadata 538, which describes the particular tables, reports, interfaces and/or other features of the particular application. In various embodiments, each virtual application 528 generates dynamic web content (including GUIs, detail views, secondary or sidebar views, and the like) that can be served to a browser or other client program 542 associated with its user device 540, as appropriate.

The runtime application generator 520 suitably interacts with the query generator 514 to efficiently obtain multi-tenant data 532 from the database 530 as needed. In a typical embodiment, the query generator 514 considers the identity of the user requesting a particular function, and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user that initiated the request.

The data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc. In certain embodiments, the data processing engine 512 and the processor 505 cooperate in an appropriate manner to perform and manage various techniques, processes, and methods associated with the providing of images containing obfuscated alphanumeric messages, as described previously with reference to FIGS. 1-7.

In operation, developers use the application platform 510 to create data-driven virtual applications 528 for the tenants that they support. Such virtual applications 528 may make use of interface features such as tenant-specific screens 524, universal screens 522 or the like. Any number of tenant-specific and/or universal objects 526 may also be available for integration into tenant-developed virtual applications 528. The data 532 associated with each virtual application 528 is provided to the database 530, as appropriate, and stored until it is requested or is otherwise needed, along with the metadata 538 that describes the particular features (e.g., reports, tables, functions, etc.) of that particular tenant-specific virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith. In an exemplary embodiment, each object type includes one or more fields for indicating the relationship of a respective object of that object type to one or more objects of a different object type (e.g., master-detail, lookup relationships, or the like).

In exemplary embodiments, the application platform 510, the data processing engine 512, the query generator 514, and the processor 505 cooperate in an appropriate manner to process data associated with a hosted virtual application 528 (such as a CRM application), generate and provide suitable GUIs (such as web pages) for presenting data on client devices 540, and perform additional techniques, processes, and methods to support the features and functions related to the provision of messaging features and functions for the hosted virtual application 528.

Still referring to FIG. 8, the data and services provided by the server 502 can be retrieved using any sort of personal computer, mobile telephone, portable device, tablet computer, or other network-enabled user device 540 that communicates via the network 545. Typically, the user operates a conventional browser or other client program 542 to contact the server 502 via the network 545 using, for example, the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. The query generator 514 suitably obtains the requested data 532 from the database 530 as needed to populate the tables, reports or other features of the particular virtual application 528. As noted above, the virtual application 528 may contain Java, ActiveX, or other content that can be presented using conventional client software running on the user device 540; other embodiments may simply provide dynamic web or other content that can be presented and viewed by the user, as desired.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a tangible non-transitory processor-readable medium in certain embodiments. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of generating a message intended for display at a computer-implemented client device, the method comprising:
    receiving, at a computer-implemented server device from the client device, a request to perform an account registration procedure, wherein the request includes a proposed identifier for a potential account holder;
    in response to receiving the request, executing the account registration procedure at the computer-implemented server device to obtain a result that confirms whether the proposed identifier is available for use with a new account;
    obtaining, at the computer-implemented server device, an alphanumeric message associated with the result, wherein the alphanumeric message represents a failure message when the proposed identifier is not available for use with the new account, and wherein the alphanumeric message represents a success message when the proposed identifier is available for use with the new account;
    generating, at the computer-implemented server device, an image that contains a visually obfuscated representation of the alphanumeric message, wherein the visually obfuscated representation of the alphanumeric message is human readable and resistant to computer-based reading techniques, wherein the visually obfuscated representation of the alphanumeric message represents the failure message when the proposed identifier is not available for use with the new account, and wherein the visually obfuscated representation of the alphanumeric message represents the success message when the proposed identifier is available for use with the new account; and
    communicating, to the client device from the computer-implemented server device, a response to the request, wherein the response comprises the image; and
    rendering the image at a display element of the client device.

2. The method of claim 1, wherein the providing step provides the image for rendering with a web page.

3. The method of claim 1, wherein the providing step provides the image in an email.

4. The method of claim 1, wherein the providing step provides the image in a text message.

5. The method of claim 1, wherein the generating step generates the image such that the visually obfuscated representation of the alphanumeric message exhibits inconsistent typographical characteristics.

6. The method of claim 5, wherein the typographical characteristics comprise font type, font size, color, kerning, font style, or capitalization.

7. The method of claim 1, wherein the generating step generates the image such that the visually obfuscated representation of the alphanumeric message is rendered with inconsistent presentation characteristics.

8. The method of claim 7, wherein the presentation characteristics comprise position of the alphanumeric message within the image, orientation of the alphanumeric message within the image, background effects, foreground effects, strikeout effects, or animation effects.

9. The method of claim 1, wherein the generating step generates encoded image data that contains information for a plurality of different alphanumeric messages, wherein a selected one of the plurality of different alphanumeric messages is intended for rendering at the client device.

10. The method of claim 1, wherein:
    the proposed identifier is a proposed email address for the potential account holder.

11. The method of claim 1, wherein:
    the proposed identifier is a proposed username for the potential account holder.

12. A method of generating a message intended for display at a computer-implemented client device, the method comprising:
    initiating an account registration procedure;
    receiving a proposed username at a computer-implemented server device from the client device during the account registration procedure;
    confirming, at the computer-implemented server device, whether or not the proposed username is available for use with a new user account;
    when the proposed username is unavailable, obtaining, at the computer-implemented server device, a first image that contains a visually obfuscated representation of a human readable failure message that indicates that the proposed username is not available for use with the new user account, and providing the first image from the computer-implemented server device to the client device for rendering at a display element of the client device, wherein the visually obfuscated representation of the human readable failure message is resistant to computer-based reading techniques; and
    when the proposed username is available, obtaining, at the computer-implemented server device, a second image that contains a visually obfuscated representation of a human readable success message that indicates that the proposed username is available for use with the new user account, and providing the second image from the computer-implemented server device to the client device for rendering at the display element of the client device, wherein the visually obfuscated representation of the human readable success message is resistant to computer-based reading techniques.

13. The method of claim 12, wherein the first image and the second image are dynamically generated with variable and inconsistent typographical characteristics.

14. The method of claim 13, wherein the typographical characteristics comprise font type, font size, color, kerning, font style, or capitalization.

15. The method of claim 12, wherein the first image and the second image are dynamically generated with variable and inconsistent presentation characteristics.

16. The method of claim 15, wherein the presentation characteristics comprise position of the alphanumeric message within the image, orientation of the alphanumeric message within the image, background effects, foreground effects, strikeout effects, or animation effects.

17. The method of claim 12, wherein:
    obtaining the first image comprises accessing a library of stored images, and selecting the first image from the library; and
    obtaining the second image comprises accessing the library, and selecting the second image from the library.

18. A computer-implemented system comprising a processor and a memory, wherein the memory comprises computer-executable instructions that, when executed by the processor, cause the computer-implemented system to:
- receive, from a computer-implemented client device, a request to create an account for a user, the request including a proposed identifier for the user;
- determine that the proposed identifier is unavailable or is available for use with the account;
- obtain an alphanumeric message to notify the user that the proposed identifier is unavailable or is available;
- generate an image that conveys the alphanumeric message in a visually obfuscated manner such that the alphanumeric message is human readable and resistant to computer-based reading techniques, and wherein the image that conveys the alphanumeric message represents a failure message that indicates that the proposed identifier is unavailable for use with the account when the proposed identifier is not available for use with the account, and wherein the image that conveys the alphanumeric message represents a success message that indicates that the proposed identifier is available for use with the account when the proposed identifier is available for use with the account; and
- provide the image for rendering at a display element of the client device.

19. The computer-implemented system of claim 18, wherein the proposed identifier comprises an email address or a username.

20. The computer-implemented system of claim 18, wherein the image is provided with a hypertext markup language document.

* * * * *